No. 667,678. Patented Feb. 12, 1901.
J. CRAIG.
HORSE BREAKING APPARATUS.
(Application filed July 3, 1900.)
(No Model.) 2 Sheets—Sheet 1.
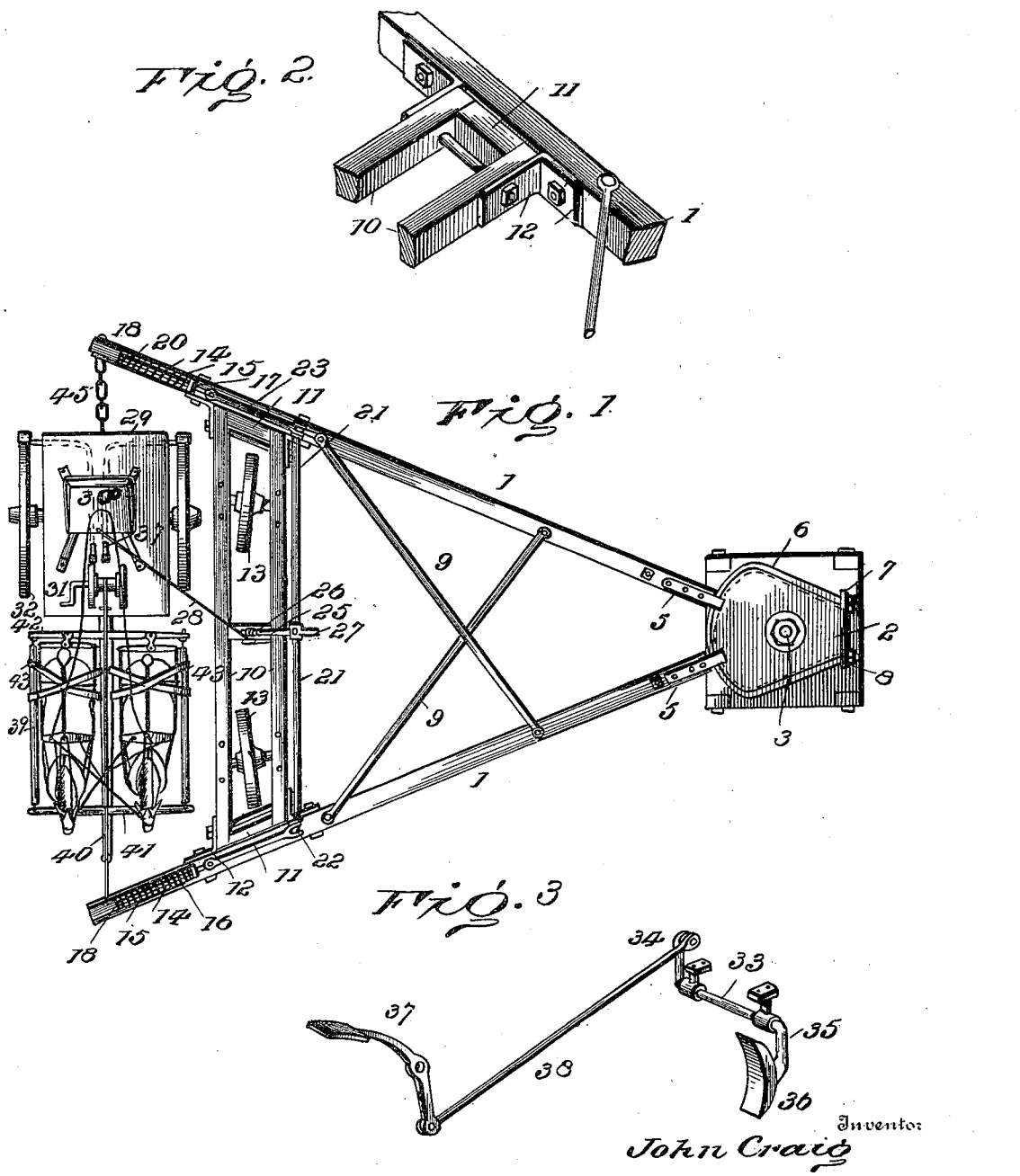
Witnesses
Inventor
John Craig

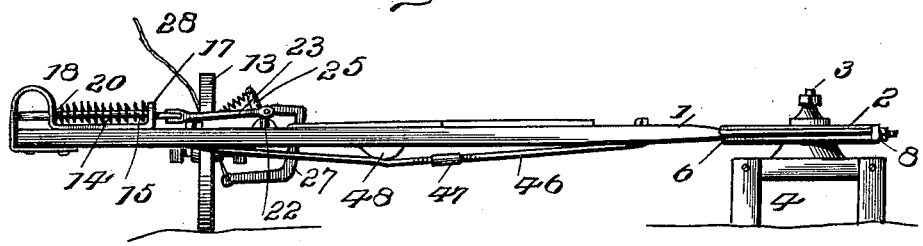
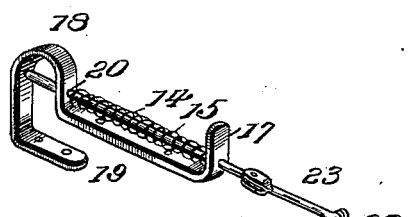
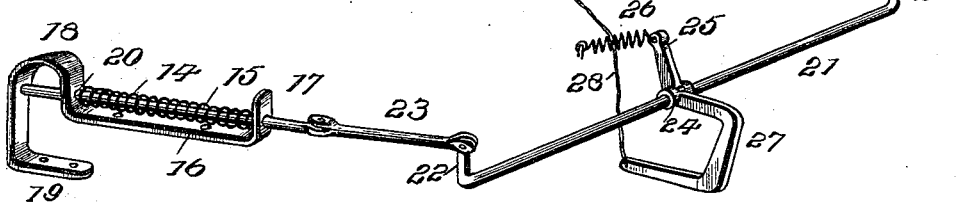
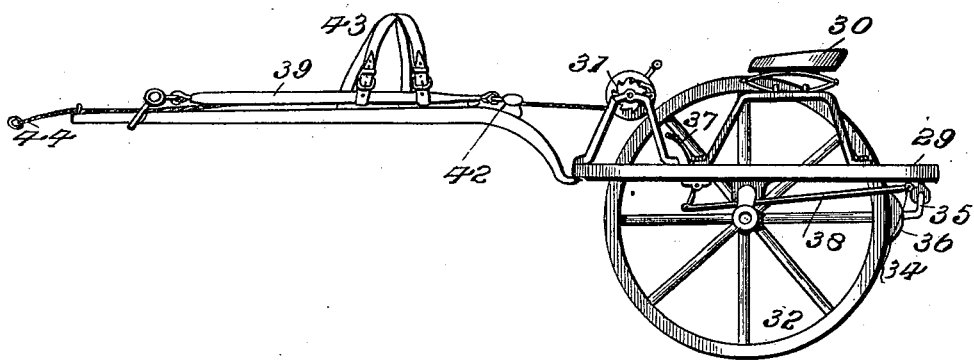

UNITED STATES PATENT OFFICE.

JOHN CRAIG, OF SCHUYLER, NEBRASKA.

HORSE-BREAKING APPARATUS.

SPECIFICATION forming part of Letters Patent No. 667,678, dated February 12, 1901.

Application filed July 3, 1900. Serial No. 22,392. (No model.)

*To all whom it may concern:*

Be it known that I, JOHN CRAIG, a citizen of the United States, residing at Schuyler, in the county of Colfax and State of Nebraska, have invented certain new and useful Improvements in Horse-Breaking Apparatus; and I do hereby declare the following to be a full, clear, and exact description of the invention, such as will enable others skilled in the art to which it appertains to make and use the same.

The primary purpose of this invention is to greatly cheapen, simplify, and reduce the number of parts of the apparatus for which Letters Patent of the United States were granted me December 19, 1899, No. 639,215, and to provide a mechanism of this character which will obviate injury alike to the trainer and the animal and prevent damage to the device. The intermediate sweep and the coacting parts of my former apparatus are dispensed with in the present instance and the releasing mechanism simplified and rendered more certain and positive in operation.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still the preferred embodiment of the invention is illustrated in the accompanying drawings, in which—

Figure 1 is a top plan view of a horse-breaking apparatus embodying the essential features of the present invention. Fig. 2 is a detail view of a portion of a sweep and the connecting-frame. Fig. 3 is a detail view in perspective of a brake contrivance. Fig. 4 is a front view of the complete apparatus. Fig. 5 is a detail view in perspective of the spring-actuated engaging devices applied to the ends of the sweeps and the releasing mechanism coöperating therewith. Fig. 6 is a side view of the cart or sulky to which the animal or team to be broken is hitched.

Corresponding and like parts are referred to in the following description and indicated in all the views of the drawings by the same reference characters.

The sweeps or arms 1 are outwardly divergent and are hinged at their inner ends to a plate 2, mounted for rotation about a vertical axis 3, secured to a stand 4 or like means let into the ground at the selected spot. Hinge members 5 are secured to the inner ends of the sweeps 1 and a stout wire or rod 6 passes through the eyes thereof to pivotally connect the sweeps to the plate, the latter being grooved in its edge to form a seat for the said rod or wire. A yoke 7 is apertured for the passage of the terminals of the wire or rod 6, and nuts 8 are fitted upon the projecting ends of the said rod to connect it and the yoke to the plate 2. The means just described form a substantial pivotal connection of the sweeps at their inner ends with the plate 2. A frame is connected at its end with the respective sweeps and comprises longitudinal bars 10 and cross-bars 11, angle-irons 12 connecting the frame with the sweeps in a loose manner, so as to admit of the sweeps having a limited vertical play, which is essential in order to avoid straining of the structure and provide for the accommodation of the sweeps to the rolling nature of the ground or surface over which they travel. Supporting-wheels 13 are applied to the end portions of the sweep-connecting frame and are set angling, so as to attract and conform to the circular path of the frame when the apparatus is in operation.

The end portions of the sweeps projecting beyond the connecting-frame are provided with spring-actuated engaging devices of similar construction and comprising rods 14, springs 15, and plates 16, having their inner ends 17 bent vertically and their outer end portions bent to provide reaches 18 and attaching ends to underlap the sweeps at their outer ends. The plates 16 are secured to the top side of the sweeps and the bent ends 17 and sides of the reaches 18 have openings in coincident relation to receive the rods 14, the springs 15 being mounted upon the rods and confined between the bent ends 17 and pins 20, applied to the outer end portions of the rods 14. A rock-shaft 21 is journaled parallel with the sweep-connecting frame and is provided at its ends with vertically-extending arms 22, which are connected by links 23 with the inner ends of the spring-actuated rods 14. A sleeve 24 has adjustable connection with the rock-shaft 21 and is preferably located centrally thereof, and an arm 25, extending from said sleeve, is connected, by means of a spring 26, with a convenient portion of the sweep-connecting frame. A compound bell-crank arm 27 projects from the sleeve 24 and a cord 28 or analogous device connects therewith and extends within convenient reach of the trainer when sitting in the cart or sulky. The spring 26 maintains the shaft 21 in a normal position and a pull upon the cord or rope 28 effects a rocking movement of the shaft 21 and a simultaneous longitudinal movement of the rods 14, whereby they are withdrawn from the spaces spanned by the reaches 18, thereby liberating the parts attached thereto. By having the arm 27 centrally disposed the effective length of the rope or cord 28 is about the same in either position of the cart or sulky with reference to the apparatus, according as one or the other of the sweeps occupies the leading or advancing position.

The cart or sulky is of simple construction and consists, essentially, of a platform 29, upon which is mounted a seat 30 and a windlass or drum 31. Independent brakes are provided for each wheel 32 and may be of any pattern, and, as shown, consist of a shaft 33, having oppositely-extending terminal arms 34 and 35, the latter carrying the shoes 36. Foot-levers 37 are conveniently located upon the platform and are connected by rods 38 with the arms 34. The provision of the brakes admits of the trainer varying the load and shifting the same from one side to the other, which is essential to the thorough breaking of an animal for draft purposes. Side bars 39 parallel the pole or tongue 40 and are attached at their ends to respectively the neck-yoke 41 and the doubletree 42. These side bars prevent the turning of the animals away from the pole 40. Kicking-straps 43 of X form are attached at their ends to the pole and side bars and extend over the hips of the animals. A rope 44 is attached at one end to the windlass or drum 31 and is adapted to wind thereon and passes through guide-eyes applied to the pole 41 and is provided at its outer end with a ring to make detachable connection with one or the other of the spring-actuated rods 14. This rope can be lengthened or shortened by a proper manipulation of the windlass or drum, thereby permitting the animals to travel in a greater or less circle, as desired. A chain or analogous connection 45 is secured at one end to the rear part of the cart or sulky and is adapted to make detachable connection with the opposite spring-actuated rod 14 when the sulky is properly hitched to the sweeps.

From the foregoing it will be understood that the apparatus is of such construction as to admit of either sweep being in the lead, according to the direction of driving the animal or team to be broken. When all is in readiness and the animal or team is hitched to the sulky or cart, the parts 44 and 45 are attached to the outer ends of the sweeps 1 by the means hereinbefore described, and upon starting the team the animals will travel in a circle. By rotating the windlass or drum 31 either forward or backward the rope 44 is lengthened or shortened, thereby permitting the animals to travel in a greater or less path, and when it has been deemed safe to detach the animals from the apparatus the trainer can effect this result by pulling upon the rope or cord 28, thereby disconnecting the cart or sulky from the sweeps without attracting the notice of the animals.

Inasmuch as the sweeps are of great length, they are straightened by truss-braces 46, which are attached at their extremities to the end portions of the sweeps, their inner ends being adjustably connected by means of a turnbuckle 47. A bridge-piece 48 projects from the under side of each sweep and the truss-brace is deflected thereby.

Having thus described the invention, what is claimed as new is—

1. In horse-breaking apparatus, and in combination with sweeps, and a plate mounted to turn about a vertical axis, hinge members applied to the inner ends of the sweeps, a rod engaged with the said hinge members and seated in the edge of the said plate, and means for detachably connecting the rod with said plate, substantially as described.

2. In horse-breaking apparatus, divergent sweeps, a frame interposed between the sweeps and connected thereto, a cart, attaching devices at the outer ends of the sweeps, a rock shaft paralleling the sweep-connecting frame and provided at its ends with offstanding arms connected with the said attaching devices, a compound bell-crank arm attached to the rock-shaft at an intermediate point, an operating-cord attached to the last-mentioned arm and extending within convenient reach of the trainer, and a second arm projected from the rock-shaft and having spring connection with the frame, substantially as set forth.

In testimony whereof I affix my signature in presence of two witnesses.

JOHN CRAIG.

Witnesses:
M. D. CAMERON,
J. S. JOHNSON.